(12) United States Patent
Lai et al.

(10) Patent No.: US 9,221,509 B2
(45) Date of Patent: Dec. 29, 2015

(54) DISPLAY APPARATUS AND VEHICLE HAVING A PROJECTOR DEVICE

(71) Applicants: DARFON ELECTRONICS (SUZHOU) CO., LTD., Suzhou, Jiangsu Province (CN); DARFON ELECTRONICS CORP., Taoyuan (TW)

(72) Inventors: Jung-Chi Lai, Taoyuan (TW); Wen-Yen Chen, Taoyuan (TW)

(73) Assignees: DARFON ELECTRONICS (SUZHOU) CO., LTD., New District, Suzhou, Jiangsu Province (CN); DARFON ELECTRONICS CORP., Gueishan, Taoyuan (TW)

( * ) Notice: Subject to any disclaimer, the term of this patent is extended or adjusted under 35 U.S.C. 154(b) by 116 days.

(21) Appl. No.: 14/153,080

(22) Filed: Jan. 13, 2014

(65) Prior Publication Data

US 2014/0203923 A1  Jul. 24, 2014

(30) Foreign Application Priority Data

Jan. 21, 2013  (TW) .............................. 102201240 U

(51) Int. Cl.
| | |
|---|---|
| B62J 6/00 | (2006.01) |
| B62J 6/02 | (2006.01) |
| B62J 27/00 | (2006.01) |
| G01C 21/20 | (2006.01) |
| G01C 21/36 | (2006.01) |

(52) U.S. Cl.
CPC .. *B62J 6/001* (2013.01); *B62J 6/02* (2013.01); *B62J 27/00* (2013.01); *G01C 21/20* (2013.01); *G01C 21/365* (2013.01)

(58) Field of Classification Search
CPC .............. B62J 6/001; B62J 27/00; B62J 6/02; G01C 21/20; G01C 21/365
USPC ........ 340/432, 456, 691.1, 691.6, 693.5, 332, 340/573.1; 362/473, 474, 486
See application file for complete search history.

(56) References Cited

U.S. PATENT DOCUMENTS

| | | | | |
|---|---|---|---|---|
| 6,733,134 | B2* | 5/2004 | Bleiner ........................... | 353/13 |
| 7,549,753 | B2 | 6/2009 | Gomez de Llarena | |
| 8,432,270 | B2* | 4/2013 | Lee et al. ...................... | 340/436 |
| 2008/0219014 | A1 | 9/2008 | Loibl | |
| 2008/0290999 | A1* | 11/2008 | Chen ............................. | 340/432 |
| 2009/0268478 | A1* | 10/2009 | James ........................... | 362/473 |
| 2010/0283590 | A1 | 11/2010 | Tee | |
| 2012/0112635 | A1 | 5/2012 | Cho | |
| 2013/0141933 | A1* | 6/2013 | Leonardo et al. ............. | 362/523 |

FOREIGN PATENT DOCUMENTS

| | | |
|---|---|---|
| CN | 200952677 Y | 9/2007 |
| CN | 201033603 Y | 3/2008 |

(Continued)

*Primary Examiner* — Anh V La
(74) *Attorney, Agent, or Firm* — Winston Hsu; Scott Margo

(57) ABSTRACT

A display Apparatus, an illumination apparatus and a vehicle having a projector device are disclosed. The projection device is disposed at the front of the vehicle through a mounting device, which is movably joined onto the vehicle, and can convert an image signal, which is outputted from an image data source, into a projection image to project the projection image on the ground in front of the vehicle in a determined distance. A user may adjust an angle of the mounting device relative to the vehicle for changing the determined distance.

13 Claims, 7 Drawing Sheets

(56) References Cited

FOREIGN PATENT DOCUMENTS

| | | |
|---|---|---|
| EP | 1916154 B1 | 12/2012 |
| TW | 201024161 A1 | 7/2010 |
| WO | 2012163670 A1 | 12/2012 |

* cited by examiner

DISPLAY APPARATUS AND VEHICLE HAVING A PROJECTOR DEVICE

BACKGROUND OF THE INVENTION

1. Field of the Invention

The invention relates to a vehicle, and especially relates to a display apparatus or an illumination apparatus of a vehicle.

2. Description of the Prior Art

U.S. patent applications, the publication numbers of which are 20100283590, 20080219014 and 20120112635, disclose using a laser to project an unchanged pattern onto the ground behind or beside a bicycle for reminding other incoming vehicles behind not to be too close.

A head-up display (HUD) was applied to airplanes at the earliest. The purpose of the design is to ensure flight safety of a pilot by always keeping his head positioned up for looking forward instead of angled down looking at lower instruments. The head-up displays used in cars also can allow a driver not to look down at lower instruments leading to distraction, which can reduce occurrence of accidents.

SUMMARY OF THE INVENTION

As bicycle exercises flourish, there is a need for a vehicle having a laser, which can project a message, for example a turning indication of a GPS route, onto the ground in front of the vehicle such as a bicycle for a rider on the vehicle.

According to a first embodiment of the invention, a display apparatus includes an image data source for outputting an image signal, a mounting device movably joined on a vehicle, and a projection device disposed on the mounting device for receiving the image signal. The projection device converts the image signal into a projection image and projects the projection image onto a ground in front of the vehicle in a first predetermined distance. Therein, a user can adjust a slanted angle of the mounting device relative to the vehicle so as to adjust the first predetermined distance.

According to a second embodiment of the invention, an illumination apparatus, disposed at a front end of a vehicle and capable of receiving an image signal from an image data source, includes a casing, an illumination light source disposed in the casing, and a projection device disposed in the casing for receiving the image signal. The illumination light source projects illumination light onto a ground in front of the vehicle in a second predetermined distance. The projection device converts the image signal into a projection image and projects the projection image onto a ground in front of the vehicle in a first predetermined distance. The second predetermined distance is longer than the first predetermined distance.

According to a third embodiment of the invention, a vehicle includes a mounting device movably joined onto the vehicle, an image data source for outputting an image signal, and a projection device disposed on the mounting device for receiving the image signal. The projection device converts the image signal into a projection image and projects the projection image onto aground in front of the vehicle in a first predetermined distance. Therein, a user can adjust a slanted angle of the mounting device relative to the vehicle so as to adjust the first predetermined distance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
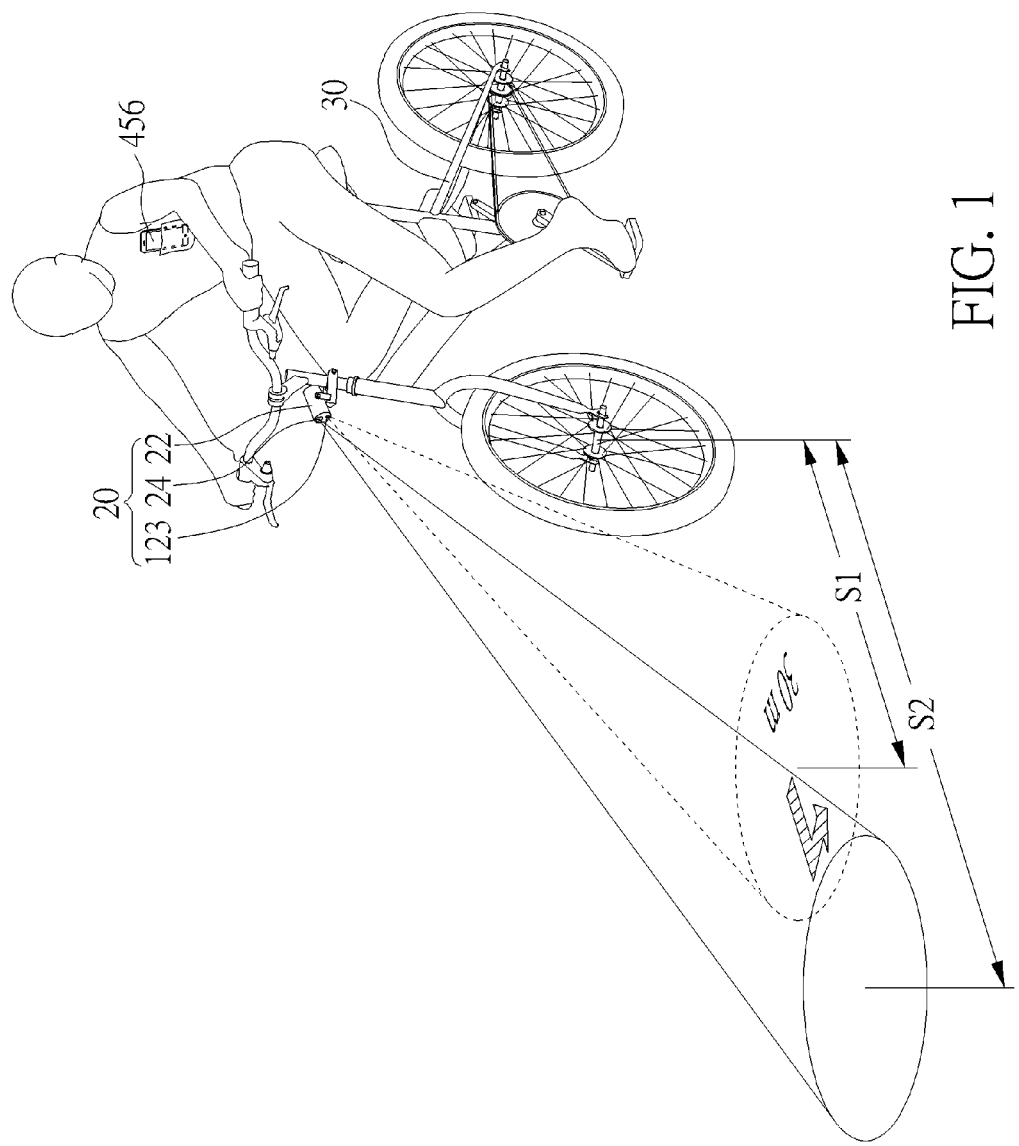
FIG. 1 is a schematic diagram illustrating an illumination apparatus.

As shown in FIG. 1, an illumination apparatus 20 is disposed at a front end of a vehicle 30. The illumination apparatus 20 is capable of receiving an image signal from an image data source 456. The illumination apparatus 20 includes a casing 22, an illumination light source 24, and a projection device 123.

The illumination light source 24 is disposed in the casing 22. The illumination light source 24 projects illumination light onto a ground in front of the vehicle 30 in a second predetermined distance s2. The projection device 123 is disposed in the casing 22 for receiving an image signal (usually in accordance with Bluetooth for example) from an image data source 456. The projection device 123 converts the image signal into a projection image and projects the projection image onto a ground in front of the vehicle 30 in a first predetermined distance s1. The second predetermined distance s2 is longer than the first predetermined distance s1, as shown by FIG. 1. The projection device 123 includes a plurality of laser light sources 333 and arranges out the projection image by selectively turning on or turning off the laser light sources 333.

Figure 2:
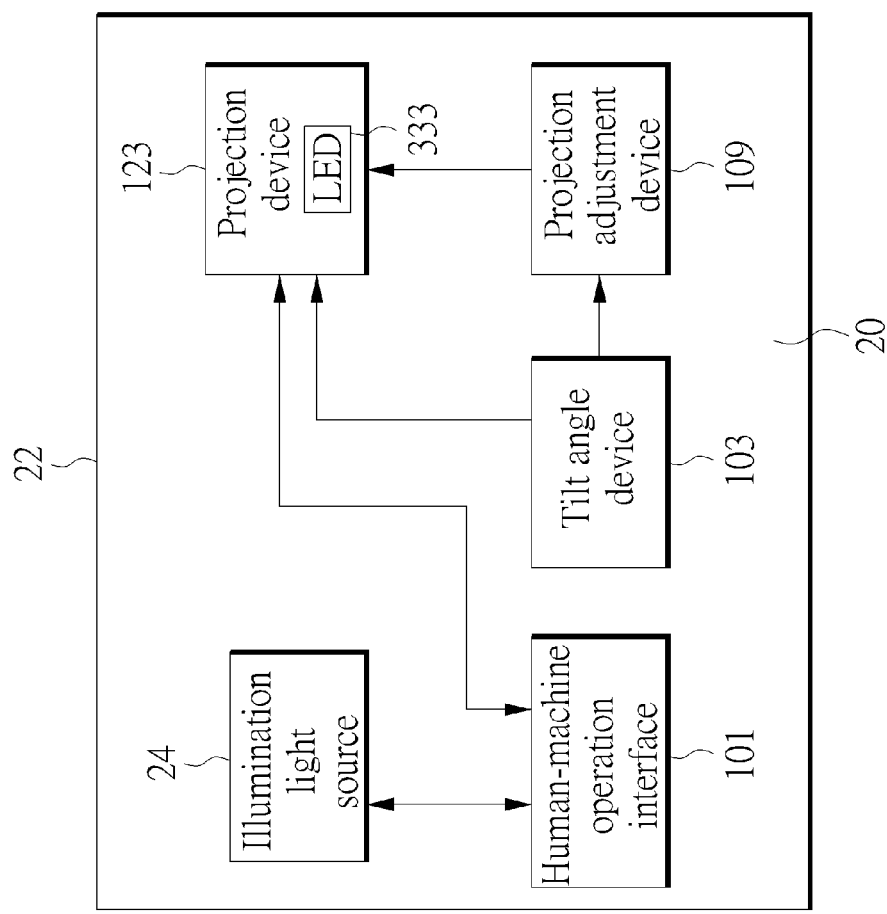
FIG. 2 is a function block diagram of the illumination apparatus.

As shown by FIG. 2, according the embodiment, the illumination apparatus 20 further includes a human-machine operation interface 101. The human-machine operation interface 101 exchanges signals with the image data source 456 and the projection device 123. In general, a user can manipulate the human-machine operation interface 101 to control the projection device 123 to start or stop projecting the projection image.

As shown by FIG. 2, according to the embodiment, the illumination apparatus 20 further includes a tilt angle device 103 for sensing a tilt angle of the projection device 123 relative to a horizontal plane for informing the user of a current tilt angle of the projection device 123. When the user installs the illumination apparatus 20, the tilt angle device 103 can inform the user whether a current angle of the installation of the projection device 123 is within a safe angle range. When the tilt angle of the projection device 123 is out of the safe angle range, the tilt angle device 103 can keeps the projection device 123 unable to be started. The tilt angle device 103 can be a bubble level 103*a* shown in FIG. 7 or a gyro 103*b* shown in FIG. 5.

Because a rotary shaft of a stem is slanted, the projection device is position horizontally when the stem is positioned forward. However, when the stem is rotated left or right, the projection device is tilted, which induces trapezoid deformation of the projection image. Therefore, the illumination apparatus 20 further includes a projection adjustment device 109. The projection adjustment device 109 will adjust the projection image according to the tilt angle of the projection device 123.

According to the embodiment by FIG. 1 and FIG. 2, the invention can project the illumination light onto the ground in front of the vehicle 30 in the second predetermined distance s2 and project the projection image onto the ground in front of the vehicle 30 in the first predetermined distance s1 at the same time or separately. The projection image includes all useful information such as an orientation of a destination, a remaining distance, a street name in front and so on.

The illumination light source 24 and the projection device 123 can be disposed separately or integrated into a single device which is installed on the handlebar of the vehicle 30 such as a bicycle.

Figure 6:
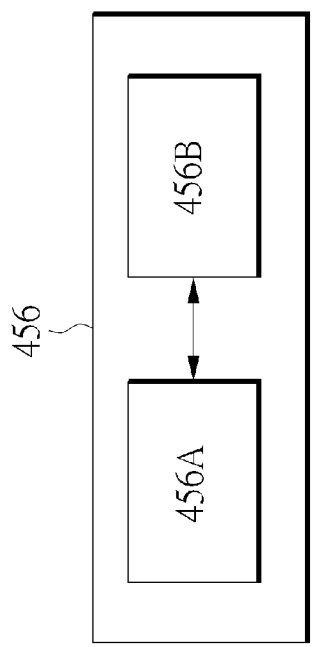
FIG. 6 is a function block diagram of the interior of an image data source.

Like a typical GPS device, according to an embodiment shown by FIG. 6, the image data source 456 includes a path guide system 456A and a position information device 456B. The position information device 456B outputs position information according to a current position of the vehicle 30. The image signal is route indication information. The path guide system 456A can adjust the route indication information according to the position information. Therein, the route indication information can be an indication of turning at an intersection. According to the position information, when the vehicle 30 approaches the intersection, the image data source 456 will request the projection device 123 to project the indication of turning at the intersection. The route indication information can be an indication of being arriving at a position. According to the position information, when the vehicle 30 approaches the position, the image data source 456 will request the projection device 123 to project the indication of being arriving at the position. After the vehicle 30 passed through the intersection or the position, the image data source 456 will shut down the projection device 123 for stopping projecting the indication of turning at the intersection or the indication of being arriving at the position for saving electronic energy.

According to another embodiment, the image data source 456 can be a typical mobile communication device having a function of receiving incoming calls, for example iPhone series of Apple Inc. Thereby, the image signal can be an incoming message including a caller ID of an incoming call. When the mobile communication device receives the incoming call, the mobile communication device will request the projection device 123 to project the incoming message.

According to another embodiment, the image data source 456 can be a speed information device for detecting a rotational speed of a bicycle wheel or calculating displacement by GPS. The speed information device outputs speed information according to a current speed of the vehicle 30. The image signal can be speed indication information. The speed information device can adjust the speed indication information according to the speed information. Therein, the speed indication information includes a warning of over speeding. According to the speed information, when the current speed of the vehicle 30 exceeds a predetermined value, the image data source 456 will request the projection device 123 to project the warning of over speeding.

Figure 3:
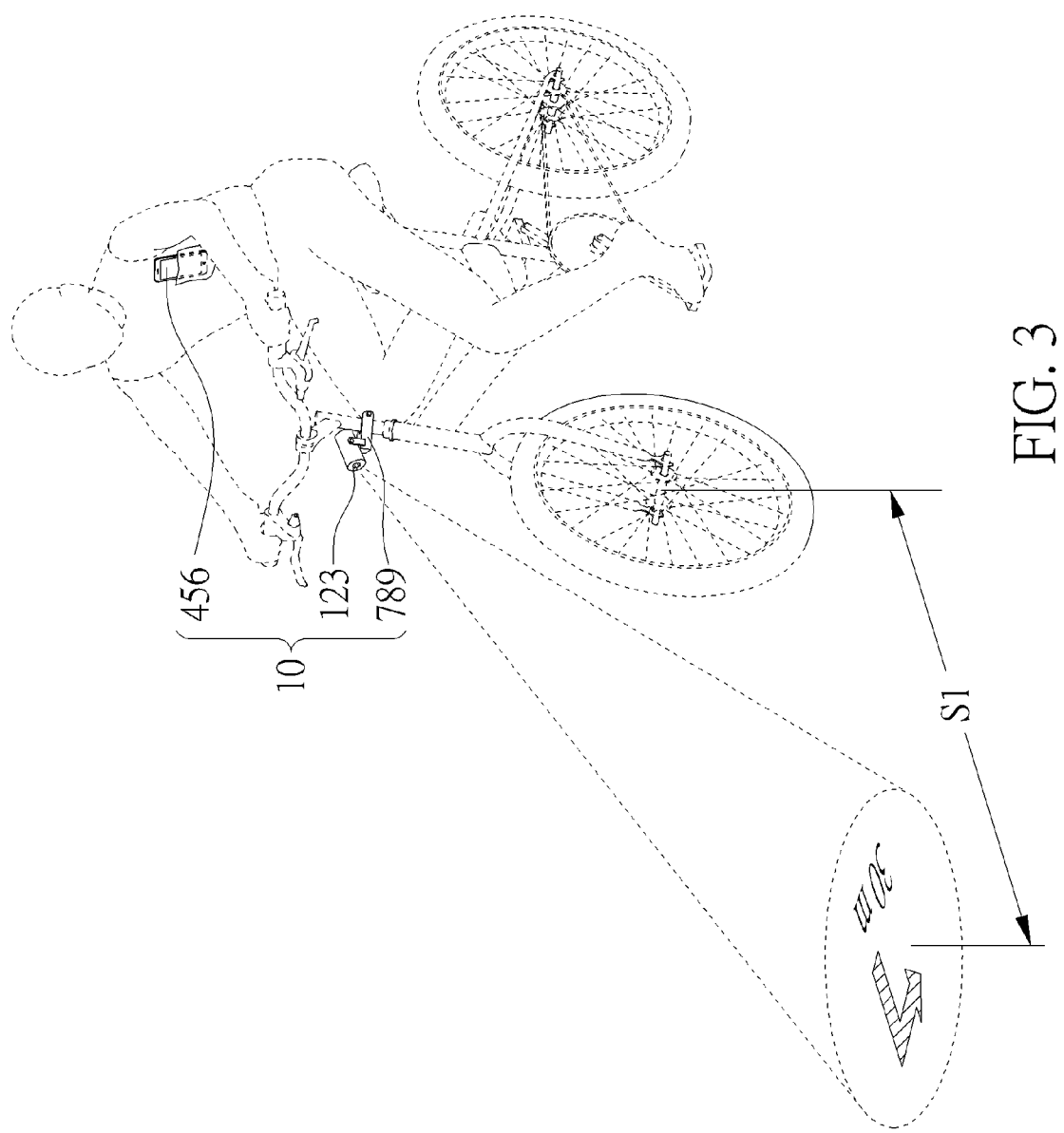
FIG. 3 is a schematic diagram illustrating a display apparatus according to a second embodiment.

According to another embodiment, as shown in FIG. 3, the invention provides a display apparatus 10. The display apparatus 10 has an image data source 456 for outputting an image signal, a mounting device 789, and a projection device 123.

The mounting device 789 is movably joined onto a vehicle 30. The projection device 123 is disposed on the mounting device 789 for receiving the image signal. The projection device 123 converts the image signal into a projection image and projects the projection image onto a ground in front of the vehicle 30 in a first predetermined distance s1. Therein, a user can adjust a slanted angle of the mounting device 789 relative to the vehicle 30 so as to adjust the first predetermined distance s1.

Figure 5:
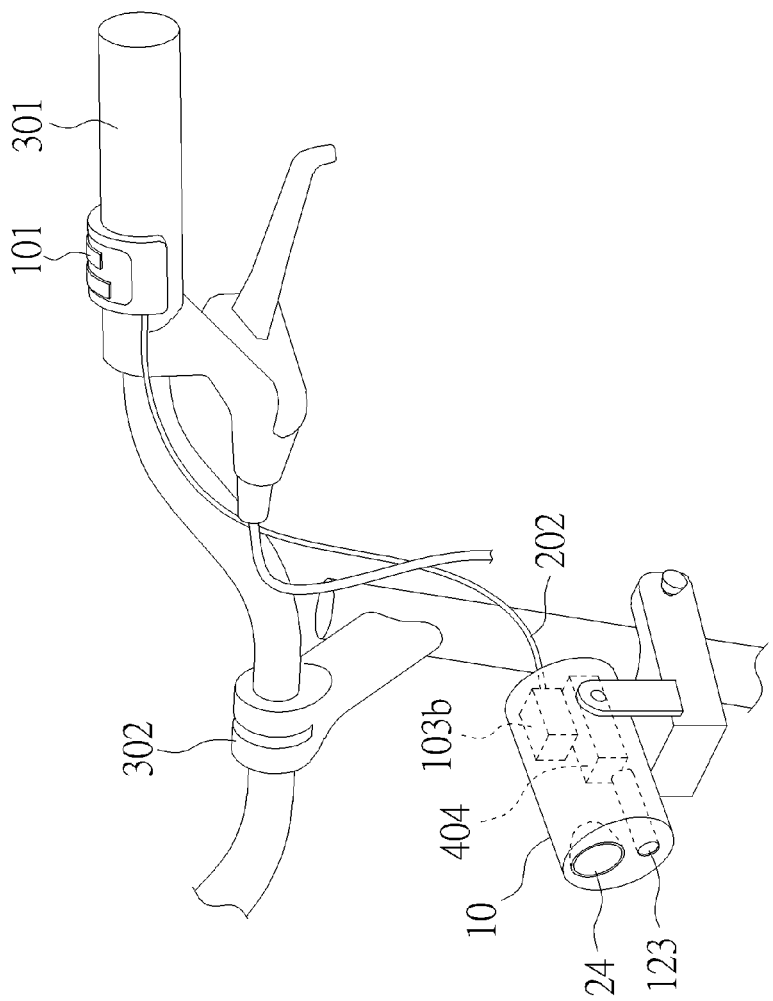
FIG. 5 is a schematic diagram illustrating the configuration relation among the illumination apparatus, the human-machine operation interface, and the handlebar.
Figure 4:
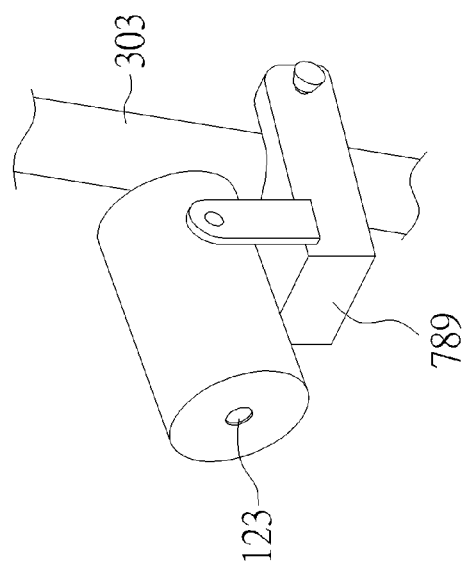
FIG. 4 is a schematic diagram illustrating the configuration relation between a vertical bar of a stem and the mounting device.

According to the embodiment shown by FIG. 4 or FIG. 5, the mounting device 789 is detachably installed onto a vertical bar 303 of the stem of the vehicle 30 (i.e. bicycle) or onto a connection end 302 of the vertical bar 303 connected to the handlebar 301. Alternatively, the mounting device 789 can be selectively installed on the left or right portion of the handlebar 301 of the vehicle 30 such as a bicycle, which is not shown by figures.

As shown by FIG. 2 and FIG. 5, according to another embodiment, the vehicle 30 further includes a handlebar 301. The display apparatus 10 further includes a human-machine operation interface 101. The human-machine operation interface 101 exchanges signals with the image data source 456 and the projection device 123. The human-machine operation interface 101 can be disposed on the handlebar 301. When the user grips the handlebar 301 by a hand, the user can manipulate the human-machine operation interface 101 just by the thumb of the hand. The user can control the projection device 123 to start or stop projecting the projection image by manipulating the human-machine operation interface 101.

Similar to the embodiment described in the above paragraphs from the fourth paragraph in the page 4 to the second paragraph in the page 5, the image data source 456 can be a GPS device, a mobile communication device, or a speed information device. The image signal can be route indication information, an incoming message or speed indication information. For the operation details of these components, please refer to above paragraphs from the fourth paragraph in the page 4 to the second paragraph in the page 5, which are not repeated herein.

Similar to the embodiment described in the above paragraphs from the last paragraph in the page 3 to the first paragraph in the page 4, the projection device 123 further includes a tilt angle device 103 and a projection adjustment device 109 for adjusting the projection image according to the tilt angle. For the operation details of these components, please refer to above paragraphs from the last paragraph in the page 3 to the first paragraph in the page 4, which are not repeated herein.

Figure 7:
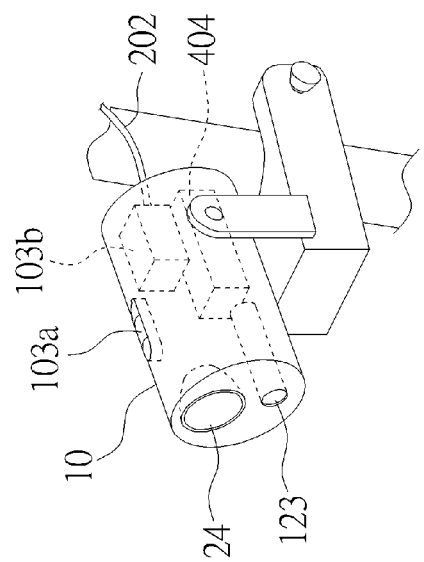
FIG. 7 is a schematic diagram illustrating an illumination light source and a projection device being integrated into a device.

Please refer to FIG. 7 illustrating another embodiment of the illumination light source 24 and the projection device 123 being integrated into a device. The components inside are a wire 202 and a battery 404. The illumination light source 24 projects illumination light onto a ground in front of the vehicle 30 in a second predetermined distance s2. The projection device 123 converts the image signal into a projection image and projects the projection image onto a ground in front of the vehicle 30 in a first predetermined distance s1.

According to the embodiment shown by FIG. 7, the invention can project the illumination light onto the ground in front of the vehicle 30 in the second predetermined distance s2 and project the projection image onto the ground in front of the vehicle 30 in the first predetermined distance s1 at the same time or separately. The projection image includes all useful information such as an orientation of a destination, a remaining distance, a street name in front and so on.

Figure 8:
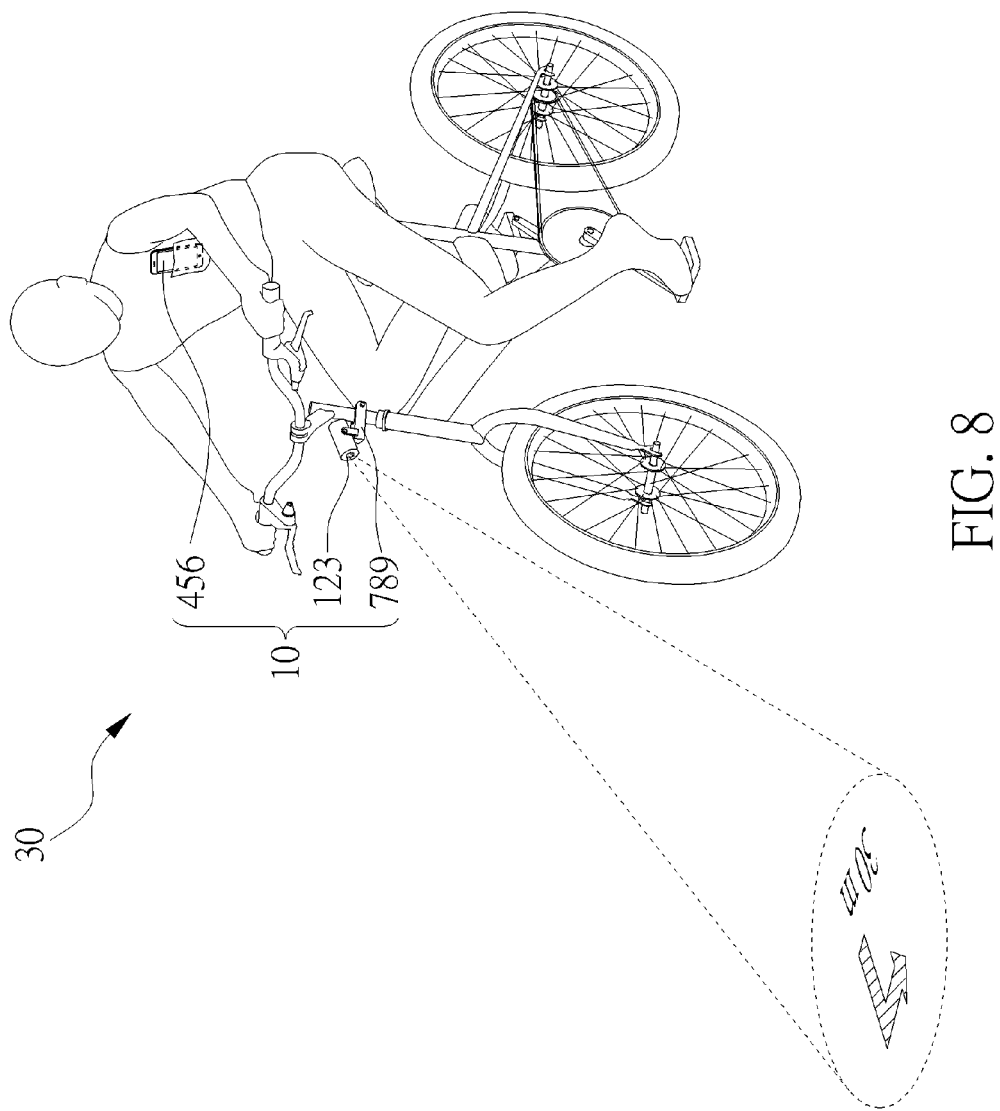
FIG. 8 is a schematic diagram illustrating a vehicle according to a third embodiment.

In another viewpoint to the invention, an embodiment shown by FIG. 8 illustrates a vehicle 30 which includes a mounting device 789, an image data source 456, and a projection device 123. The mounting device 789 is movably joined onto the vehicle 30. The image data source 456 is used for outputting an image signal. The projection device 123 is disposed on the mounting device 789 for receiving the image signal. The projection device 123 converts the image signal into a projection image and projects the projection image onto a ground in front of the vehicle 30 in a first predetermined distance s1. Therein, a user can adjust a slanted angle of the mounting device 789 relative to the vehicle 30 so as to adjust the first predetermined distance s1.

According to the embodiment of the mounting device 789 shown in FIG. 4 or FIG. 5, the mounting device 789 is detachably installed onto the vertical bar 303 of the stem of the vehicle 30 (i.e. bicycle) or onto the connection end 302 of the vertical bar 303 connected to the handlebar 301. Alternatively, the mounting device 789 can be selectively installed on the left or right portion of the handlebar 301 of the vehicle 30 such as a bicycle, which is not shown by figures.

According to an embodiment, the vehicle 30 includes an illumination light source 24. The illumination light source 24 projects illumination light onto a ground in front of the vehicle 30 in a second predetermined distance s2. The second predetermined distance s2 is longer than the first predetermined distance s1, similar to that shown by FIG. 1.

As shown by FIGS. 1 through 7, the vehicle 30 further includes a handlebar 301. The projection device 123 further includes a human-machine operation interface 101. The human-machine operation interface 101 exchanges signals with the image data source 456 and the projection device 123. The human-machine operation interface 101 can be disposed on the handlebar 301. When the user grips the handlebar 301 by a hand, the user can manipulate the human-machine operation interface 101 just by the thumb of the hand. The user can control the projection device 123 to start or stop projecting the projection image by manipulating the human-machine operation interface 101.

Similar to the embodiment described in the above paragraphs from the fourth paragraph in the page 4 to the second paragraph in the page 5, the image data source 456 can be a GPS device, a mobile communication device, or a speed information device. The image signal can be route indication information, an incoming message or speed indication information. For the operation details of these components, please refer to above paragraphs from the fourth paragraph in the page 4 to the second paragraph in the page 5, which are not repeated herein.

Similar to the embodiment described in the above paragraphs from the last paragraph in the page 3 to the first paragraph in the page 4, the projection device 123 further includes a tilt angle device 103 and a projection adjustment device 109 for adjusting the projection image according to the tilt angle. For the operation details of these components, please refer to above paragraphs from the last paragraph in the page 3 to the first paragraph in the page 4, which are not repeated herein.

According to the embodiment shown by FIG. 8, the invention can project the illumination light onto the ground in front of the vehicle 30 in the second predetermined distance s2 and project the projection image onto the ground in front of the vehicle 30 in the first predetermined distance s1 at the same time or separately. The projection image includes all useful information such as an orientation of a destination, a remaining distance, a street name in front and so on.

Figure 9:
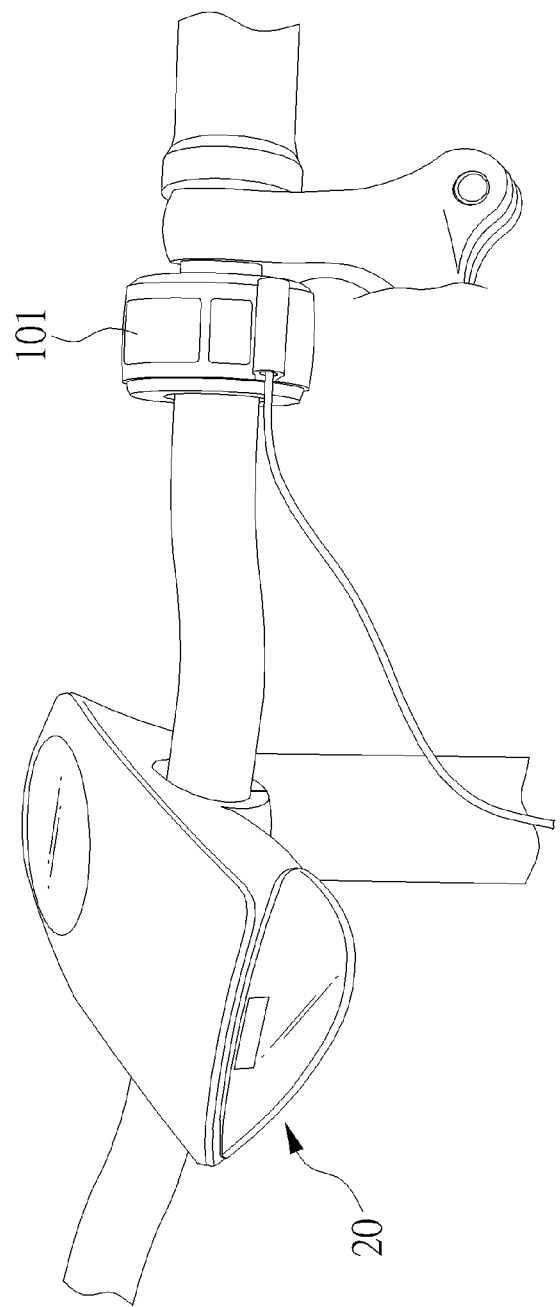
FIG. 9 is a schematic diagram illustrating an embodiment of the illumination apparatus being installed

As illustrated in the foregoing, the Illumination Apparatus 20 can be installed onto a connection end 302 of a vertical bar connected to a transverse bar, as illustrated by an embodiment shown in FIG. 9.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display apparatus, comprising:
   an image data source for outputting an image signal;
   a mounting device movably joined onto a vehicle;
   a casing disposed on the mounting device;
   a projection device disposed in the casing for receiving the image signal, the projection device converting the image signal into a projection image and projecting the projection image onto a ground in front of the vehicle in a first predetermined distance; and
   an illumination light source, disposed in the casing and positioned higher than the projection device, for projecting illumination light onto a ground in front of the vehicle in a second predetermined distance, the second predetermined distance being longer than the first predetermined distance;
   wherein a user can adjust a slanted angle of the mounting device relative to the vehicle so as to adjust the first predetermined distance.

2. The display apparatus of claim 1, the vehicle comprising a handlebar, wherein the display apparatus further comprises a human-machine operation interface disposed on the handlebar, the human-machine operation interface exchanges signals with the image data source and the projection device, and when the user grips the handlebar by a hand, the user can manipulate the human-machine operation interface just by the thumb of the hand.

3. The display apparatus of claim 1, wherein the image data source comprises a path guide system and a position information device, the position information device outputs position information according to a current position of the vehicle, the image signal is route indication information, and the path guide system modifies the route indication information according to the position information.

4. The display apparatus of claim 1, wherein the image data source is a mobile communication device, the image signal is an incoming message, and when the mobile communication device receives an incoming call, the mobile communication device will request the projection device to project the incoming message.

5. The display apparatus of claim 1, wherein the image data source is a speed information device, the speed information device outputs speed information according to a current speed of the vehicle, the image signal is speed indication information, and the speed information device modifies the speed indication information according to the speed information.

6. The display apparatus of claim 1, further comprising a tilt angle device for sensing a tilt angle of the projection device relative to a horizontal plane for informing the user of a current tilt angle of the projection device.

7. A vehicle, comprising:
   an image data source for outputting an image signal; and
   a projection device for receiving the image signal, the projection device converting the image signal into a projection image and projecting the projection image onto a ground in front of the vehicle in a first predetermined distance;

wherein the image signal is route indication information modified according to a current position of the vehicle, the route indication information comprises an indication of turning at an intersection, according to the current position of the vehicle, when the vehicle approaches the intersection, the image data source will request the projection device to project the indication of turning at the intersection, and after the vehicle passed through the intersection, the image data source will shut down the projection device for saving electronic energy.

8. The vehicle of claim 7, wherein the image data source comprises a path guide system, and the path guide system modifies the route indication information according to the current position of the vehicle.

9. The vehicle of claim 7, wherein the image data source comprises a path guide system and a position information device, the position information device outputs position information according to the current position of the vehicle, the path guide system modifies the route indication information according to the position information, the route indication information comprises an indication of being arriving at a position, according to the position information, when the vehicle approaches the position, the image data source will request the projection device to project the indication of being arriving at the position, and after the vehicle passed through the position, the image data source will shut down the projection device for saving electronic energy.

10. A vehicle, comprising:
an image data source for outputting an image signal; and
a projection device for receiving the image signal, the projection device converting the image signal into a projection image and projecting the projection image onto a ground in front of the vehicle in a first predetermined distance;
wherein the image signal is an incoming message representing a mobile communication device receiving an incoming call, and the image data source requests the projection device to project the incoming message.

11. The vehicle of claim 10, wherein the image data source comprises the mobile communication device.

12. A vehicle, comprising:
an image data source for outputting an image signal; and
a projection device for receiving the image signal, the projection device converting the image signal into a projection image and projecting the projection image onto a ground in front of the vehicle in a first predetermined distance;
wherein the projection device further comprises a tilt angle device for sensing a tilt angle of the projection device relative to a horizontal plane for informing the user of a current tilt angle of the projection device;
wherein when the tilt angle of the projection device is out of a safe angle range, the tilt angle device keeps the projection device unable to be started.

13. The vehicle of claim 12, wherein the projection device further comprises a projection adjustment device, and the projection adjustment device is capable of modifying the projection image according to the tilt angle.

* * * * *